April 12, 1932. F. KINCH 1,853,982
GRASS DIGGER
Filed March 25, 1931 5 Sheets-Sheet 1

Frank Kinch
INVENTOR
BY Victor J. Evans
and Co. ATTORNEY

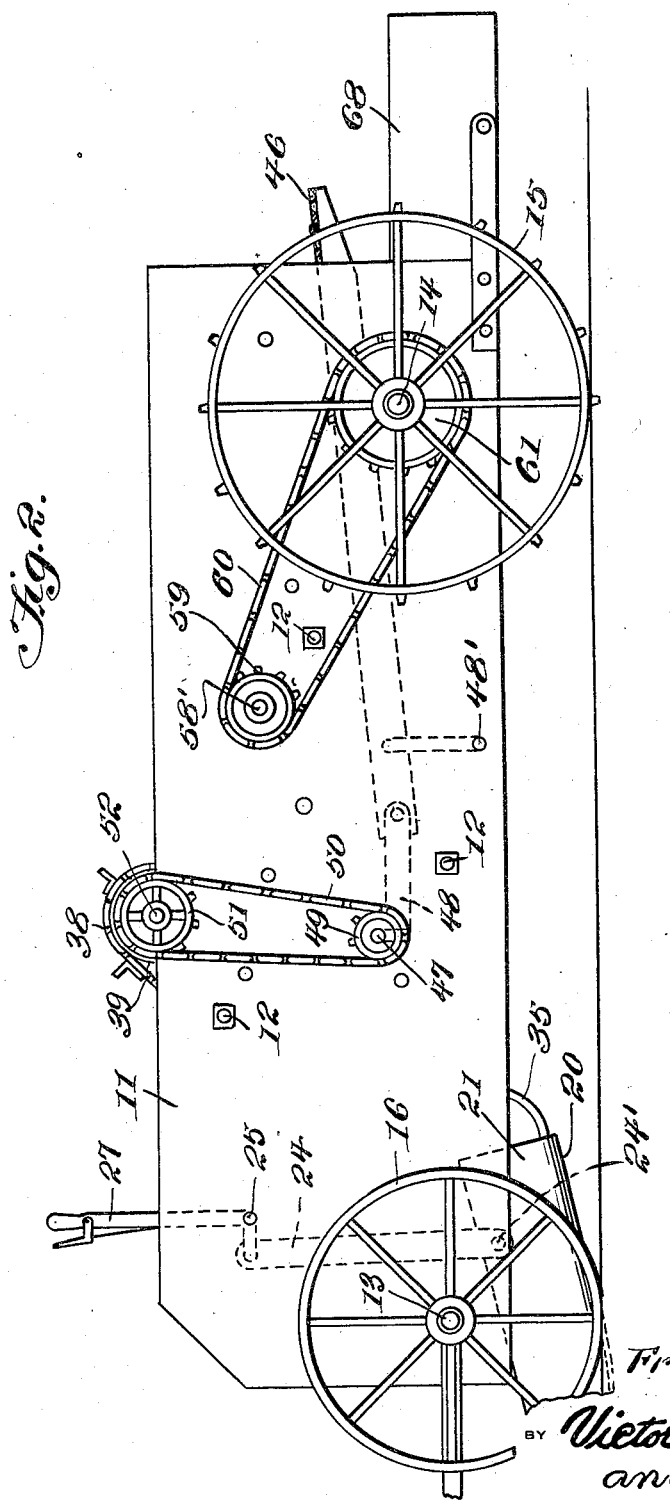

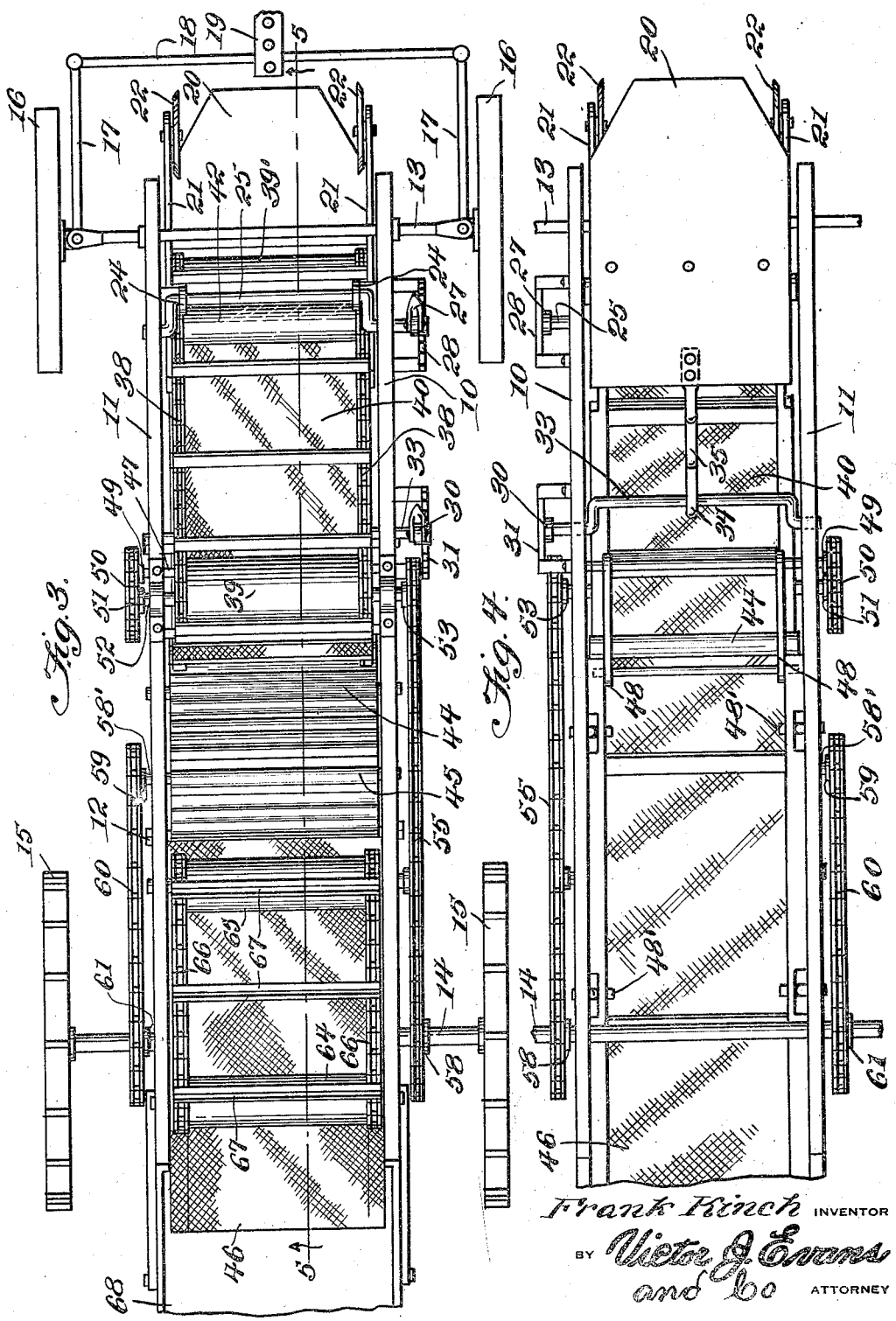

April 12, 1932.  F. KINCH  1,853,982
GRASS DIGGER
Filed March 25, 1931  5 Sheets-Sheet 4

Frank Kinch
INVENTOR
BY Victor J. Evans
and Co. ATTORNEY

April 12, 1932.  F. KINCH  1,853,982
GRASS DIGGER
Filed March 25, 1931   5 Sheets-Sheet 5
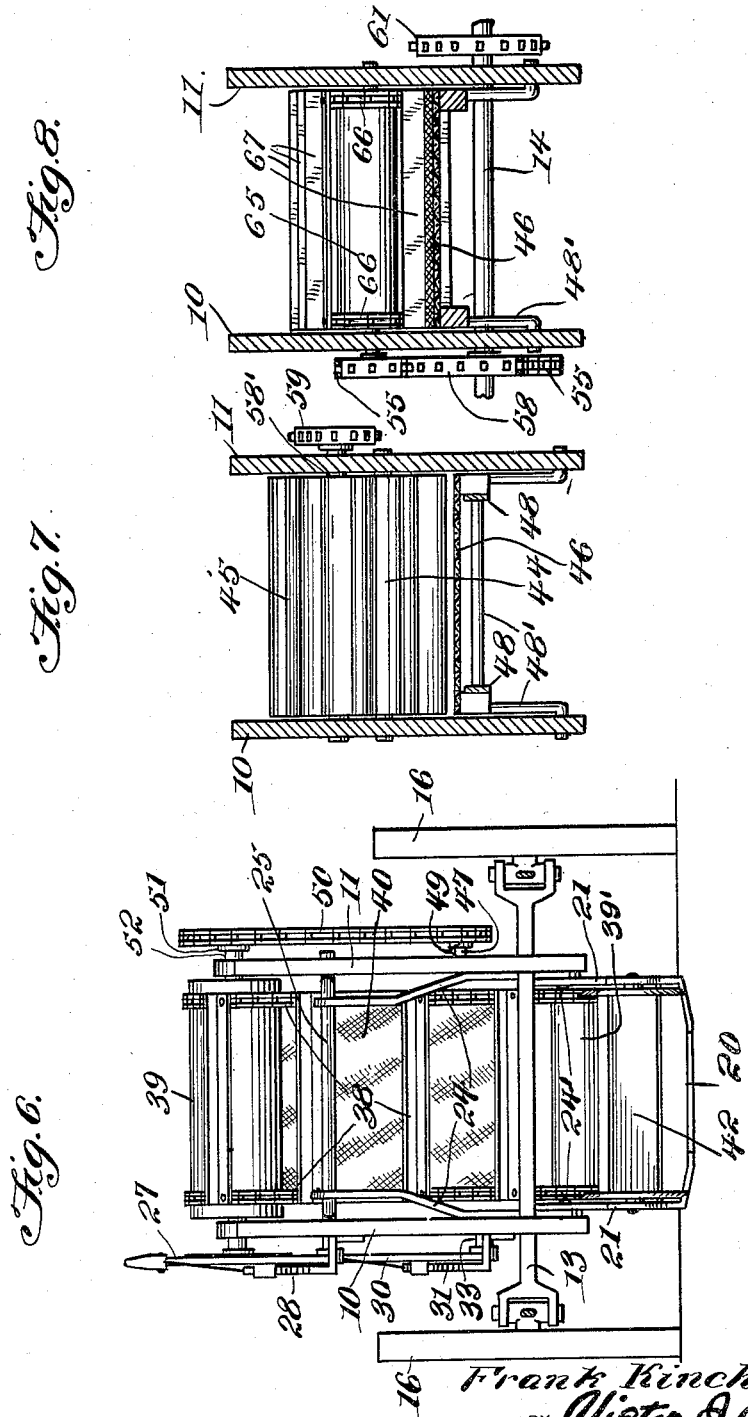

Patented Apr. 12, 1932

1,853,982

UNITED STATES PATENT OFFICE

FRANK KINCH, OF BELMONT, WISCONSIN

GRASS DIGGER

Application filed March 25, 1931. Serial No. 525,627.

The object of this invention is to provide a machine especially adapted for removing quitch grass or quack grass, and other similar growth from fields, in order to permit of the cultivation thereof, and especially to prevent the accidental escape of any of the material before it is suitably disposed of.

The further object is to provide in a machine of this type, a scraper, scoop or shovel controlled by particular adjusting devices, and an elevator for moving the material from the shovel over a screen to a pair of crushing rolls from which it is disposed to an oscillating screen operating beneath cutting means which will divide the material into small portions prior to its transfer to a rear receptacle or box designed to safely retain the material until disposed of manually.

Further objects include the provision of actuating mechanism operatively connected with the moving parts of the apparatus.

With the foregoing and other objects in view, the invention consists in the novel construction and arrangement of elements herein disclosed, it being understood that modifications may be made within the scope of the claims, without departing from the spirit of the invention.

In the drawings forming part of this application,

Figure 2 is also in elevation and shows the left side of the machine.

Figure 3 is a top plan view.

Figure 4 is a view in bottom plan.

Figure 6 is in front elevation.

Figure 7 is on line 7—7 of Figure 5, and represents a vertical transverse section.

Figure 8 is on line 8—8 of Figure 5 and is a vertical transverse section.

Figure 1:
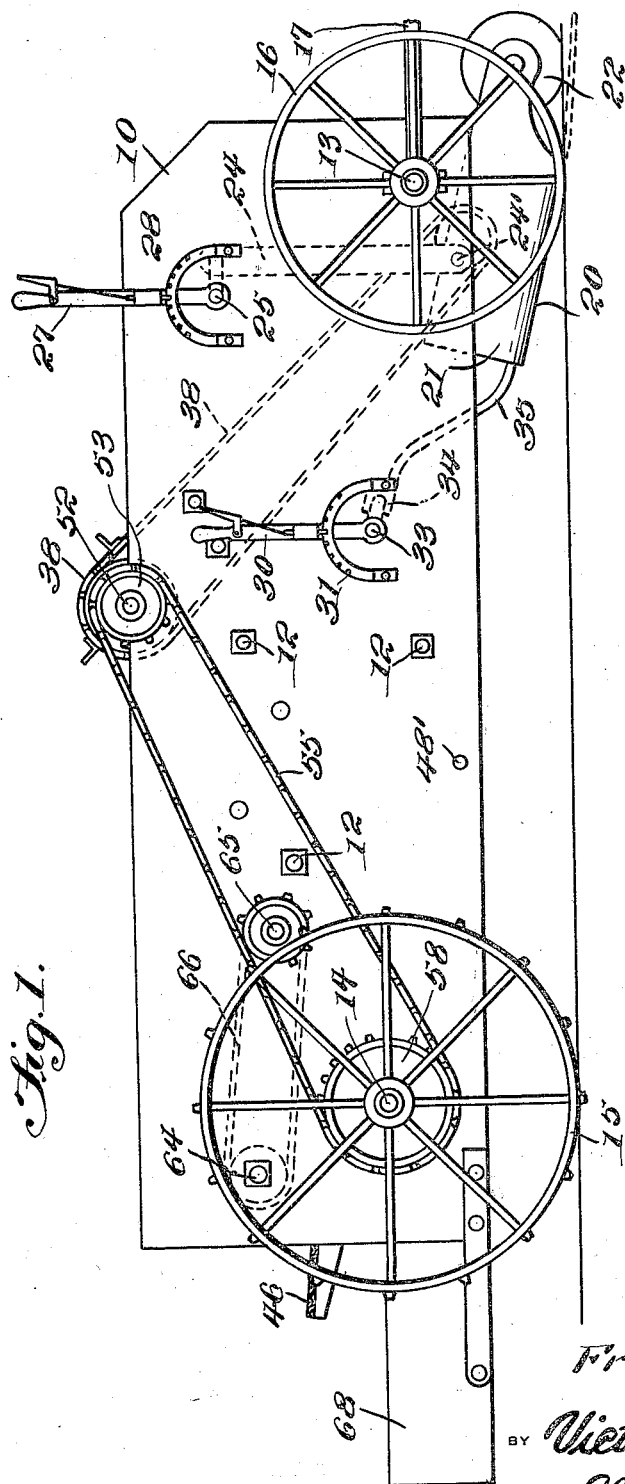
Figure 1 is a view showing the structure on the right side of the machine, the view being in elevation.
Figure 5:
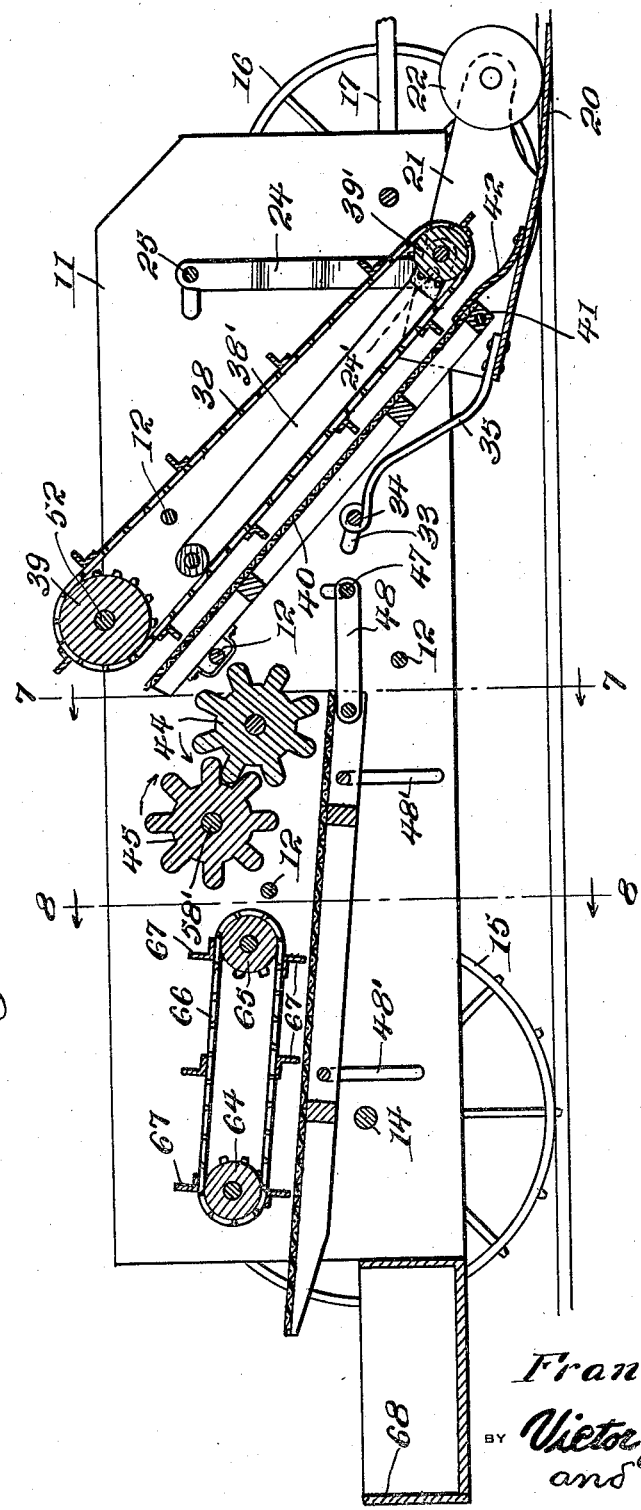
Figure 5 is in vertical longitudinal section on line 5—5 of Figure 3.

The structure includes a main side member 10 extending longitudinally on the right side of the machine, and a similar element 11 on the left side, these members being connected for example by transverse rods 12. The forward and rear axles 13 and 14 have their bearings in the side elements and mount rear ground wheels, designated 15, and forward wheels 16. Knuckles 17 serve the usual purpose and control of the wheels is through rods 17 and transverse bar 18, a draft element being designated 19.

A scraper, scoop shovel, or like tool or implement is designated 20, having sides 21, and rotary cutters 22 at the forward portions are shown as being beveled reversely and are adapted to cut the material being removed by the implement 20.

The scraper or shovel 20 is suspended by hangers 24 pivoted to the shovel at 24′, and a transverse rock shaft 25 mounted in the side elements 10 and 11 passing through the hangers and controls the elevation of the shovel. The shovel itself is controlled by lever 27 co-operating with segment 28.

The angle of the shovel is controlled by lever 30 co-operating with segment 31 and mounted to control transverse rock shaft 33 passing through apertured end 34 of bracket 35 on the shovel 20.

The material is removed from the shovel by elevating conveyor 38 operated by upper roller 39, the flexible elements of the conveyor also passing around lower roller 39′. This elevating conveyor passes over the lower screen 40, tracks 38′ serving an obvious purpose for the conveyor belts—and the dirt is partly removed by the lower screen. This screen extends within the side elements of the shovel and is pivoted thereto at 41, and the upper portion of this screen extends freely over one of the transverse rods 12 of the main structure including sides 10 and 11. Apron 42 extends from the shovel to the screen just referred to.

The material is discharged by elevator 38 to the meshing rolls 44, 45, which have longitudinal ribs or long teeth formed thereon, and the material is reduced to more compact condition by the crushing action of the rolls, and passes thence to screen 46 mounted for longitudinal movement by transverse rock shaft 47, connected by links 48 with the inner end of the screen. Hangers 48′ each include reversely extending end portions permitting mounting and oscillating movement of the screen, between the side members. Shaft 47 carries wheel 49 driven by chain 50 passing over wheel 51 on upper transverse shaft 52 carrying the roller and wheel 53 to which rotation is imparted by chain 55 and wheel 58 on the rear axle of the machine. This axle mounts the ground wheels before referred to.

One of the meshing and crushing rollers is mounted on shaft 58 having wheel 59 driven by chain 60 and wheel 61, on the rear axle of the machine. Above screen 46 is a pair of rollers 64, 65, mounting belts or chains 66 and cutter bars or knives 67, each comprising angle members as shown are carried by the elements 66, and separate the material passing over screen 46, the material being then delivered to a receptacle or box 68 secured to the side elements 10 and 11 of the main structure and having a capacity of say 300 pounds.

No grass or roots should be permitted to return to the ground, because they will within a short time start a new growth. The machine is capable of removing a large amount of grass and the roots thereof, and of converting them into condition for removal under the most favorable circumstances, so that accidental discharge by wind or the like can be avoided.

What I claim is:—

1. In a grass digging machine, a main structure, forward and rear axles mounted therein, a scoop-like digging device, hangers for supporting this device in the main structure, and connected with the scoop rearwardly of the point of engagement of said digging device with the ground below the forward axle of the machine, means controlling the vertical position of the hangers, rotary cutters mounted at the forward portion of the digging device, a crank shaft in the main structure, a lever controlling the shaft and element connecting the crank shaft with the rear portion of the scoop-like digging device for changing the depth at which the scoop is operative.

2. In a grass digging machine, a main structure, axles mounted therein, a digging device, hangers for supporting this device in the main structure, means controlling the vertical position of the hangers, a conveyor extending upwardly and rearwardly from a point within the digging device, and a screen connected with and extending into the digging device, said screen being substantially parallel with the conveyor and below the path of travel thereof, a crank shaft in the main structure, a lever controlling the shaft and element connecting the crank shaft with the rear portion of the digging device for changing the elevation thereof.

3. In a grass digging machine, a main structure, axles mounted therein, a digging device, hangers for supporting this device in the main structure, means controlling the vertical position of the hangers, a crank shaft in the main structure, a lever controlling the shaft and element connecting the crank shaft with the rear portion of the digging device for changing the elevation thereof, meshing rolls for receiving material discharged by the conveyor, an oscillating screen extending rearwardly from the rolls, and means including a crank shaft for imparting movement to the screen, and a screen extending into and connected with the digging device, this device being subject to movement during adjustment while the screen is subject to limited responsive movement.

4. In a grass digging machine, a main structure, axles mounted therein, a digging device, hangers for supporting this device in the main structure, means controlling the vertical position of the hangers and the elevation of the digging device, a crank shaft in the main structure, a lever controlling the shaft and element connecting the crank shaft with the rear portion of the digging device for changing the inclination thereof at any elevation determined by the hangers, crushing rolls mounted rearwardly of the conveyor, a reciprocable screen mounted below these rolls and means for imparting movement to the rolls and screen.

5. In a grass digging machine, a main structure, a digging device mounted in the forward portion of the main structure, elevating means operative from a point intermediate the ends of the digging device for conveying material from said digging device, crushing rolls positioned rearwardly of the elevating means, a longitudinally movable screen extending below the rolls, mechanism for actuating the elevating means, and means for reciprocating the screen by said mechanism actuating the lifting means.

6. In a grass digging machine, a main structure, a digging device mounted in the forward portion of the main structure, elevating means for conveying material from a point directly within the digging device, crushing rolls positioned rearwardly of the elevating means, a longitudinally movable screen extending below the rolls, mechanism for actuating the elevating means, a rear axle for the machine, means for driving the rolls from the axle, and independent means for driving the mechanism actuating the elevating means and screen from said rear axle.

In testimony whereof I affix my signature.

FRANK KINCH.